United States Patent [19]
Onorato et al.

[11] Patent Number: 6,042,968
[45] Date of Patent: *Mar. 28, 2000

[54] PROCESS FOR PRODUCING POLYBENZIMIDAZOLE FABRICS FOR USE IN FUEL

[75] Inventors: Frank J. Onorato, Phillipsburg; Michael J. Sansone, Berkeley Heights; Dai W. Kim; Stuart M. French, both of Chatham; Faruq Marikar, Westfield, all of N.J.

[73] Assignee: Aventis Research & Technologies GmbH & Co. KG, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/895,060

[22] Filed: Jul. 16, 1997

[51] Int. Cl.⁷ ............ H01M 8/10; H01M 2/16; H01M 6/18
[52] U.S. Cl. ............ 429/188; 429/33; 429/188; 429/204; 429/207
[58] Field of Search ............... 429/30, 33, 203; 427/126.1; 210/500

[56] References Cited

U.S. PATENT DOCUMENTS

| | | |
|---|---|---|
| 3,533,879 | 10/1970 | Levine . |
| 3,737,042 | 6/1973 | Boom .................... 210/321 |
| 3,841,492 | 10/1974 | Brinegar ................. 210/500 |
| 3,942,950 | 3/1976 | Powers et al. ............... 8/173 |
| 4,020,142 | 4/1977 | Davis ...................... 264/347 |
| 4,263,245 | 4/1981 | Tan ........................ 264/184 |
| 4,309,372 | 1/1982 | Sheibley . |
| 4,448,687 | 5/1984 | Wang . |
| 4,460,708 | 7/1984 | Stuetz .................... 502/426 |
| 4,512,894 | 4/1985 | Wang ..................... 210/500 |
| 4,598,099 | 7/1986 | Trouw . |
| 4,634,530 | 1/1987 | Kuder ..................... 210/500 |
| 4,664,761 | 5/1987 | Zupancic et al. . |
| 4,693,824 | 9/1987 | Sansone . |
| 4,814,399 | 3/1989 | Sansone et al. . |
| 4,826,502 | 5/1989 | Sansone et al. ........... 8/115.59 |
| 4,868,008 | 9/1989 | Marikar .................. 427/126 |
| 4,927,909 | 5/1990 | Wadhwa et al. . |
| 4,945,156 | 7/1990 | Jenekhe et al. . |
| 5,091,087 | 2/1992 | Calundann et al. . |
| 5,208,298 | 5/1993 | Chung et al. ............. 525/435 |
| 5,264,542 | 11/1993 | Hughes et al. ............ 528/331 |
| 5,277,981 | 1/1994 | Haider et al. ............ 428/408 |
| 5,292,981 | 3/1994 | Bowman et al. . |
| 5,368,614 | 11/1994 | Lim ...................... 29/623.5 |
| 5,525,436 | 6/1996 | Savinell ................... 429/30 |
| 5,599,639 | 2/1997 | Sansone ................... 429/33 |
| 5,688,613 | 11/1997 | Li ....................... 429/192 |
| 5,688,614 | 11/1997 | Li ....................... 429/192 |
| 5,693,434 | 12/1997 | Li ....................... 429/192 |
| 5,716,727 | 2/1998 | Savinell ................... 429/33 |
| 5,723,231 | 3/1998 | Wu ....................... 429/203 |
| 5,807,412 | 9/1998 | Li ...................... 29/623.5 |
| 5,847,920 | 12/1998 | Li ....................... 361/525 |
| 5,945,233 | 8/1999 | Onorato ................... 429/33 |

FOREIGN PATENT DOCUMENTS

| | | |
|---|---|---|
| 465251 | 1/1992 | European Pat. Off. . |
| 604883 | 7/1994 | European Pat. Off. . |
| WO92/10527 | 6/1992 | WIPO . |
| WO94/15773 | 7/1994 | WIPO . |
| WO 96/13872 | 5/1996 | WIPO . |
| WO97/23919 | 7/1997 | WIPO . |
| WO98/04008 | 1/1998 | WIPO ............... H01M 2/16 |
| WO98/14505 | 4/1998 | WIPO ................ C08J 5/22 |

OTHER PUBLICATIONS

W. Wieczorek et al, "Protonic Hydrogels for Application in Ambient Temperature Fuel Cells", in New Mater. Fuel Cell Syst. I, Proc. Int. Symp., 1$^{st}$ Montreal Canada, pp. 115–127 (Jul. 9–13, 1995).

S. Zecevic et al, "Kinetics of $O_2$ Reduction on a Pt Electrode Covered with a Thin Film of Solid Polymer Electrolyte", *Journal of Electrochemical Society*, 144(9):2973–2982 (Sep. 9, 1997).

Abstract of Japanese Patent JP3104921, published May 1, 1991.

Abstract of Japanese Patent JP4004066, published Jan. 30, 1974.

*Primary Examiner*—Maria Nuzzolillo
*Assistant Examiner*—Mark Ruthkosky
*Attorney, Agent, or Firm*—Howson and Howson

[57] ABSTRACT

A method for producing polybenzimidazole (PBI) fabrics for use as fuel cell or battery electrolytes by soaking a sulfonated or non-sulfonated PBI fabric in an acid solution, whereby the fibers of the fabric become swollen with the acid solution; and drying the fabric to remove residual water or methanol and concentrating the acid.

24 Claims, No Drawings

PROCESS FOR PRODUCING POLYBENZIMIDAZOLE FABRICS FOR USE IN FUEL

FIELD OF THE INVENTION

This invention relates to the manufacture of fabrics for use as polymer electrolytes in fuel cell applications.

BACKGROUND OF THE INVENTION

Fuel cells can be configured in numerous ways with a variety of electrolytes, fuels and operating temperatures. For example, fuels such as hydrogen or methanol can be provided directly to the fuel cell electrode. Alternatively, fuels, such as methane or methanol, can be converted to a hydrogen rich gas mixture external to the cell itself and subsequently provided to the fuel cell. Air is the source of oxygen in most fuel cells, although in some applications, the oxygen is obtained by hydrogen peroxide decomposition or from a cryogenic storage system.

Although there are theoretically a limitless number of combinations of electrolyte, fuel, oxidant, temperatures and so on, practical systems include solid polymer electrolyte systems using hydrogen or hydrazine as the fuel source and pure oxygen as the oxidant. Polybenzimidzole (PBI) which has been doped with a strong acid is an example of a suitable solid polymer for use in an electrolyte system It is known in the art to imbibe polybenzimidazole (PBI) dense films with a strong acid to make a proton conducting media. Recently, U.S. Pat. No. 5,525,436, issued Jun. 11, 1996, described a method of doping PBI with a strong acid, such as phosphoric acid or sulfuric acid, such that a single phase system is formed, i.e., acid is dissolved in the polymer.

Even in view of the advances in the art, the performance, high cost and processability of suitable polymeric electrolyte materials remain important considerations in fuel cell construction with respect to polymeric media for fuel cells. There remains a need in the art for new methods and materials for use in the preparation of fuel cells and fuel cell components.

SUMMARY OF THE INVENTION

In one aspect, the present invention provides a method of preparing a polymeric, preferably PBI, fabric for use as an electrolyte in a fuel cell. In one embodiment, the method comprises soaking a fabric consisting of non-sulfonated or sulfonated PBI fiber in an acid solution. The voids in the fabric are closed by the swelling of the acid-imbibed fibers. It is necessary to close these voids in order to make the membrane gas tight and prevent the flow of gases across the fabric during fuel cell operation.

In another aspect, the present invention provides fabrics consisting of polymeric fibers, preferably PBI sulfonated or unsulfonated fibers, which fabrics are characterized by high acid loadings and satisfactory electrochemical and/or mechanical properties. By "high acid loadings" is meant that the fabrics contain between about 40to about 95% by weight of imbibed acid. These fabrics are prepared by standard methods of weaving and knitting. The PBI fabrics may be characterized by better retention of the acid than the fabrics of the prior art.

In still another aspect, the invention provides a fuel cell comprising a sulfonated or unsulfonated acid-imbibed PBI fabric according to this invention.

Other aspects and advantages of the present invention are described further in the following detailed description of the preferred embodiments thereof.

DETAILED DESCRIPTION OF THE INVENTION

The present invention provides an improvement over the art in methods of preparing a polymeric fabric for use as an electrolyte in fuel cells, and in the fabrics themselves. Generally, according to this invention, a fabric containing polymeric fiber is imbibed with, or soaked in, an acid solution until the fabric contains between about 40% to about 95% by weight of the acid.

According to this invention, the polymeric fiber which makes up the fabric useful in this invention includes, but is not limited to, polybenzimidazole (PBI), poly(pyridine), poly(pyrimidine), polyimidazoles, polybenzthiazoles, polybenzoxazoles, polyoxadiazoles, polyquinoxalines, polythiadiazoles, poly(tetrazapyrenes) and mixtures of sulfonated, non-sulfonated PBI and/or such polymeric fibers.

Currently, the preferred fabric contains PBI fiber, which may be either sulfonated or non-sulfonated. The inventors have found that since PBI is a basic polymer it has an affinity for acids and will retain the acids under extreme conditions. Particularly the sulfonated fabric, which is crosslinked, will retain additional amounts of acid with less mechanical degradation than uncrosslinked fabric. The method of the invention is advantageous due to the speed of imbibition and the resulting morphology of the fabric produced. Even in view of this preference, however, one of skill in the art may readily substitute other fabrics containing other polymeric fibers.

Suitable fabrics are readily available from a variety of commercial sources, and are preferably woven. However, knitted or non-woven fabrics which permit imbibation of the acid, as described herein, may also be utilized.

Currently, it is desirable for the fibers of the fabrics utilized in the invention to be of a small diameter, i.e., in the range of about 10 to about 500 denier. More preferably, the fibers are a diameter of about 20 denier. Fibers of small dimension are required so that the resulting fabric has a thickness in the range of 0.5 to 5 mils.

A presently preferred fabric is a coated fabric prepared as described in co-filed, co-pending U.S. patent application for "Process for Producing Polybenzimidazole Pastes and Gels for Use in Fuel Cells ", which is incorporated herein by reference. This polymeric fabric, preferably PBI fabric which may be imbibed with acid, is provided with a coating of between 0.1 to 100 $\mu M$ (preferably 10–30 $\mu M$) of a PBI paste or gel containing between 70–99.9% by weight acid, and preferably about 95–99% acid, by weight. The PBI paste or gel is prepared by mixing PBI polymer flake with an acid solution which permits the polymer to swell and form a matrix having a gel-like or paste-like consistency at room temperature. This method is described in detail in the above-referenced patent application, which is incorporated by reference. The PBI gel or paste coating is applied using conventional means. The preparation of the coated fabric is described in detail in the above-reference application.

Once a desired fabric is selected, the fabric is soaked in an acid solution for a time sufficient to permit acid imbibation without losing the fabric-like form. Currently, preferred acid solutions include phosphoric acid, sulfuric acid, triflic acid, methanesulfonic acid, and mixtures thereof, in a solvent. Phosphoric acid is particularly preferred for use in unsulfonated fibers of the invention. Currently, the most preferred acid solution contains phosphoric acid and water or methanol. However, other suitable solvents, e.g., such as DMAC and NMP, or mixtures of these solvents with water and/or methanol, for this and other selected acids are known to and may be readily determined by one of skill in the art.

The acid solution desirably contains between about 5 weight percent (wt %) to about 100 wt % of an acid and from about 0 up to about 95 wt % solvent. In a currently preferred embodiment, the acid solution contains about 50 wt % acid and 50 wt % water or methanol.

In one embodiment of the method of this invention, the fabric is submerged in an acid bath. In another embodiment, the fabric and acid are combined in a suitable mixing container. This mixing may be performed at room temperature, but any temperature between the freezing point and boiling point of the acid may be used.

Optionally, the mixture is heated to enable the fabric imbibation to proceed more rapidly than at room temperature. Desirably, the mixture is heated to between about 30° C. to about 200° C. A more preferable temperature range is between about 50 to about 90° C. Suitably, the heating step is performed for between about 30 seconds to about eight hours. A desirable heating time spans about 5 minutes to two hours. With respect to the selected fiber in the fabric, for example, fabric made of unsulfonated PBI fiber may imbibe less than about 65 to about 70% acid. In contrast, fabric made of sulfonated PBI fiber is cross-linked and may imbibe greater than about 65 to about 70% acid and still retain satisfactory mechanical properties.

The resulting acid-soaked fabric is dried at room temperature to about 200° C., and preferably between about 80° C. to about 180° C., to remove residual solvent such as DMAC, NMP, water, and/or methanol. This drying step entraps the acid, forming the acid-imbibed fabric. The voids in the fabric are closed by the swelling of the acid-imbibed fibers, which makes the fabric gas-tight (i.e., an effective barrier to transmission of gases) and prevents the flow of gases across the fabric during fuel cell operation.

According to the methods of this invention, the resulting acid-imbibed fabric contains high acid loadings, of between about 40 to about 95% acid, by weight, of the imbibed fabric. Generally, for a fabric to function adequately as an electrolyte in a fuel cell, about 50% by weight or more acid is required. More preferably, the fabric contains about 50 to about 75% acid, by weight of the imbibed fabric. The amount of acid imbibed in the resulting fabric depends upon, and can be controlled by, the selection of the fibers, the fabric, the tightness of the weave in woven fabric, the temperature, the soak time, and the acid concentration in the solution. Given this disclosure, one of skill in the art may readily make such selections and modify the invention, while still falling within this invention. An advantage of the method of this invention is that the acid imbibition occurs over such a short timespan in contrast to prior art methods which take between 10 to 72 hours. This advantage is reflected in both reduced cost and better performance of the electrolyte.

The acid-imbibed fabric of the invention is particularly well adapted for use as an electrolyte in a fuel cell. The imbibed fabric of the invention, because it is in fabric form, is easily handled and eliminates the need to use solvents in the electrolyte. Further, the acid-imbibed polymeric fabric of the invention has been found to retain acid and thus electrolytic capacity for a longer time than prior art electrolytes. This is particularly true for the acid-imbibed fabric of the invention. Thus, the present invention further provides fuel cells containing the acid-imbibed fabric of the invention.

The following examples illustrate the preferred compositions and methods of the invention, using PBI as the exemplified polymer. These examples are illustrative only and do not limit the scope of the invention.

EXAMPLE 1

Unsulfonated PBI Acid-Imbibed Fabrics

Unsulfonated PBI fabric is soaked in an aqueous acid solution containing 85% by weight phosphoric acid. This soaking occurs at a temperature of about 21° C. for about 24 hours. The fabric is then oven dried at a temperature of about 120° C. for about 12 hours to remove residual water. The resulting acid-imbibed fabric contains about 50% acid by weight.

EXAMPLE 2

Sulfonated PBI Acid-Imbibed Fabrics

Sulfonated PBI fabric is soaked in an aqueous acid solution containing 85% by weight phosphoric acid. This soaking occurs at a temperature of about 60° C. for about 4 hours. The fabric is then oven dried at a temperature of about 120° C. for about 12 hours to remove residual water. The resulting acid-imbibed fabric contains about 65% acid by weight.

EXAMPLE 3

Acid Imbibed and Coated PBI Fabrics

Acid-imbibed fabric according to the present invention was prepared essentially as described in Example 1 above. However, the imbibed PBI fabric was also coated prior to use in an electrode assembly. Briefly, this fabric was prepared as follows.

Both sides of an acid-imbibed PBI fabric of Example 1 were coated with PBI paste which was prepared as follows. PBI polymer (1 g) was added to a solution containing 117 g 85% $H_3PO_4$ and 15%, by weight, water in a slow mixer. The mixture is agitated at elevated temperature, i.e., 100° C. to remove residual water until a consistent paste is obtained. The resulting paste or gel contains about 99% acid by weight. The resulting coating was about 1 mil thick on each side. In an electrode assembly, contact with the electrodes is facilitated by the presence of the gel/paste coating resulting in superior fuel cell performance.

EXAMPLE 4

A Membrane Electrode Assembly

A fabric constructed from unsulfonated PBI is soaked in an aqueous acid solution containing 85% by weight phosphoric acid. This soaking occurs at a temperature of about 60° C. for about 4 hours. The fabric may then be dried at a temperature of about 150° C. for 6 hours to remove any residual water from the acid treatment. Alternatively, the fabric is fabricated into a membrane electrode assembly and then dried in-situ in the fuel cell. The resulting acid-imbibed fabric contains about 65% acid by weight.

The membrane electrode assembly is then constructed by placing the acid imbibed fabric between two electrodes and hot pressing at a temperature of 130° C. and at a pressure of 50 $kg/cm^2$ for a time period of about thirty seconds. The membrane electrode assembly is then placed into the fuel cell. Under typical operating conditions at 0.7 volts, the resulting current density and power density is approximately 450 milliamperes/$cm^2$ and 315 milliwatts/$cm^2$, respectively.

Numerous modifications and variations of the present invention are included in the above-identified specification and are expected to be obvious to one of skill in the art. Such modifications and alterations to the compositions and processes of the present invention are believed to be encompassed in the scope of the claims appended hereto.

What is claimed is:

1. A method for producing an electrolyte comprising the steps of:

providing a fabric comprising polybenzimidazole fibers with voids between the fibers;

soaking said fabric in an acid solution comprising an acid and a solvent, for a time sufficient for said fabric to imbibe said acid in an amount of about 40 to about 95% of the total weight of the imbibed fabric, thereby swelling the fibers and closing voids between the fibers, wherein the imbibed fabric has a thickness of 0.5 to 5 mils; and fabricating the acid-imbibed fabric into a membrane electrode assembly.

2. The method according to claim 1 wherein said solvent is selected from the group consisting of water, methanol, dimethylacetamide, N-methyl-2-pyrrolidinone, and mixtures thereof.

3. The method according to claim 2 further comprising drying the fabric to remove residual water and other solvents.

4. The method according to claim 1 wherein said acid is selected from the group consisting of phosphoric acid, sulfuric acid, triflic acid, methanesulfonic acid, and mixtures thereof.

5. The method according to claim 1 wherein the acid imbibed in said fabric is between about 50 to about 75% of the total weight of said imbibed fabric.

6. The method according to claim 1 wherein the acid imbibed in said fabric is greater than about 65% of the total weight of said imbibed fabric.

7. The method according to claim 4 wherein said acid solution comprises between about 5 to about 100 weight percent of an acid.

8. The method according to claim 7 wherein said acid solution further comprises up to about 95 weight percent of a solvent.

9. The method according to claim 8 wherein said acid solution comprises about 50% acid and 50% solvent.

10. The method according to claim 1 wherein said fabric is formed of unsulfonated PBI fibers.

11. The method according to claim 1 wherein said fabric is formed of sulfonated PBI fibers.

12. An electrolyte comprising a PBI fabric, said PBI fabric having an acid content of between about 40 to about 95% by weight and a thickness of about 0.5 to about 5 mil.

13. The fabric according to claim 12 wherein said fabric is formed of unsulfonated PBI fibers.

14. The fabric according to claim 12 wherein said fabric is formed of sulfonated PBI fibers.

15. A fuel cell comprising a PBI fabric comprising an acid content of between about 40 to about 95% by weight and a thickness of about 0.5 to about 5 mil.

16. A method for producing an imbibed polybenzimidazole fabric useful as an electrolyte comprising the steps of providing a fabric comprising polybenzimidazole fibers with voids between the fibers; and soaking said fabric in an acid solution comprising an acid and a solvent, for a time sufficient for said fabric to imbibe said acid, thereby swelling the fibers and the closing voids between the fibers, wherein said polybenzimidazole fibers in said fabric are in the range of about 10 to about 500 denier.

17. The method according to claim 16, wherein said PBI fibers in said fabric are in the range of about 20 denier.

18. The method according to claim 1, wherein said method further comprises heating the fabric in an acid solution to about 30° C. to about 200° C.

19. The method according to claim 18, wherein said method comprises heating the fabric in an acid solution to about 50° C. to about 90° C.

20. The method according to claim 3, wherein the fabric is dried to a temperature in the range of about 80° C. to about 180C.

21. A method for producing an imbibed polybenzimidazole fabric useful as an electrolyte comprising the steps of:

providing a fabric comprising polybenzimidazole fibers and having voids between the fibers; and soaking said fabric in an acid solution comprising about 5% by weight to about 100% by weight acid and about 0% by weight to about 95% by weight solvent, for a time sufficient for said fabric to imbibe said acid, thereby swelling the fibers and closing the voids between the fibers drying the fabric to remove said solvent, wherein the imbibed polybenzimidazole fabric contains acid in an amount of about 40% to about 95% of the total weight of the imbibed fabric and has a thickness of about 0.5 to about 5 mils.

22. The method according to claim 21, wherein said acid solution comprises about 50% acid and about 50% solvent.

23. The method according to claim 21, wherein said acid solution comprises phosphoric acid.

24. The method according to claim 23, wherein said acid solution comprises water or methanol.

* * * * *